(12) United States Patent (10) Patent No.: US 12,664,241 B2

Sugahara (45) Date of Patent: Jun. 23, 2026

(54) OPERATION CONTROL DEVICE, OPERATION CONTROL METHOD, AND COMPUTER-READABLE STORAGE MEDIUM

(71) Applicant: JVCKENWOOD Corporation, Yokohama (JP)

(72) Inventor: Takayuki Sugahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 174 days.

(21) Appl. No.: 18/596,700

(22) Filed: Mar. 6, 2024

(65) Prior Publication Data

US 2024/0211557 A1 Jun. 27, 2024

Related U.S. Application Data

(63) Continuation of application No. PCT/JP2022/025001, filed on Jun. 23, 2022.

(30) Foreign Application Priority Data

Sep. 14, 2021 (JP) ................................. 2021-149595
Sep. 14, 2021 (JP) ................................. 2021-149687

(51) Int. Cl.
*G06F 21/31* (2013.01)
*G06F 3/01* (2006.01)

(52) U.S. Cl.
CPC .............. *G06F 21/31* (2013.01); *G06F 3/015* (2013.01)

(58) Field of Classification Search
CPC .................................. G06F 3/015; G06F 21/31
See application file for complete search history.

(56) References Cited

U.S. PATENT DOCUMENTS 10,489,785 B1 11/2019 Burks et al.
2012/0069247 A1 3/2012 Morikawa et al.
(Continued)

FOREIGN PATENT DOCUMENTS

JP 63-054618 3/1988
JP 2013-117957 6/2013
(Continued)

OTHER PUBLICATIONS

International Search Report and Written Opinion for International Application Serial No. PCT/JP2022/025001 mailed on Aug. 16, 2022, 9 pages.

*Primary Examiner* — Jonathan A Bui

(74) *Attorney, Agent, or Firm* — Amin, Turocy & Watson, LLP

(57) ABSTRACT

An operation control device includes: a brain-information acquiring unit configured to acquire brain information of a user; a determining unit configured to determine whether the brain information acquired by the brain-information acquiring unit includes brain information corresponding to a first command based on a language system, brain information corresponding to a second command based on a system other than the language system, and brain information corresponding to a third command that is a password; and an executing unit configured to execute processing corresponding to the first command when the determining unit determines that the brain information corresponding to the first command, the brain information corresponding to the second command, and the brain information corresponding to the third command are acquired.

5 Claims, 7 Drawing Sheets

(56)          References Cited

U.S. PATENT DOCUMENTS

| | | | |
|---|---|---|---|
| 2013/0138248 A1* | 5/2013 | Mathan | G06F 3/015 |
| | | | 700/258 |
| 2015/0338917 A1* | 11/2015 | Steiner | H04M 1/72412 |
| | | | 345/156 |
| 2016/0103487 A1* | 4/2016 | Crawford | A61B 5/117 |
| | | | 600/544 |
| 2016/0282940 A1* | 9/2016 | Hong | G06F 3/1446 |
| 2017/0281086 A1* | 10/2017 | Donaldson | A61B 5/1118 |
| 2018/0107274 A1* | 4/2018 | Li | G06F 3/013 |
| 2020/0268296 A1* | 8/2020 | Alcaide | G06F 3/013 |
| 2021/0011545 A1 | 1/2021 | Min | |
| 2022/0155867 A1* | 5/2022 | Connor | G02C 5/14 |
| 2022/0301375 A1* | 9/2022 | Farooq | G07C 9/37 |

FOREIGN PATENT DOCUMENTS

| | | |
|---|---|---|
| JP | 2021-518588 | 8/2021 |
| WO | 2011/105000 | 9/2011 |

* cited by examiner

FIG.4

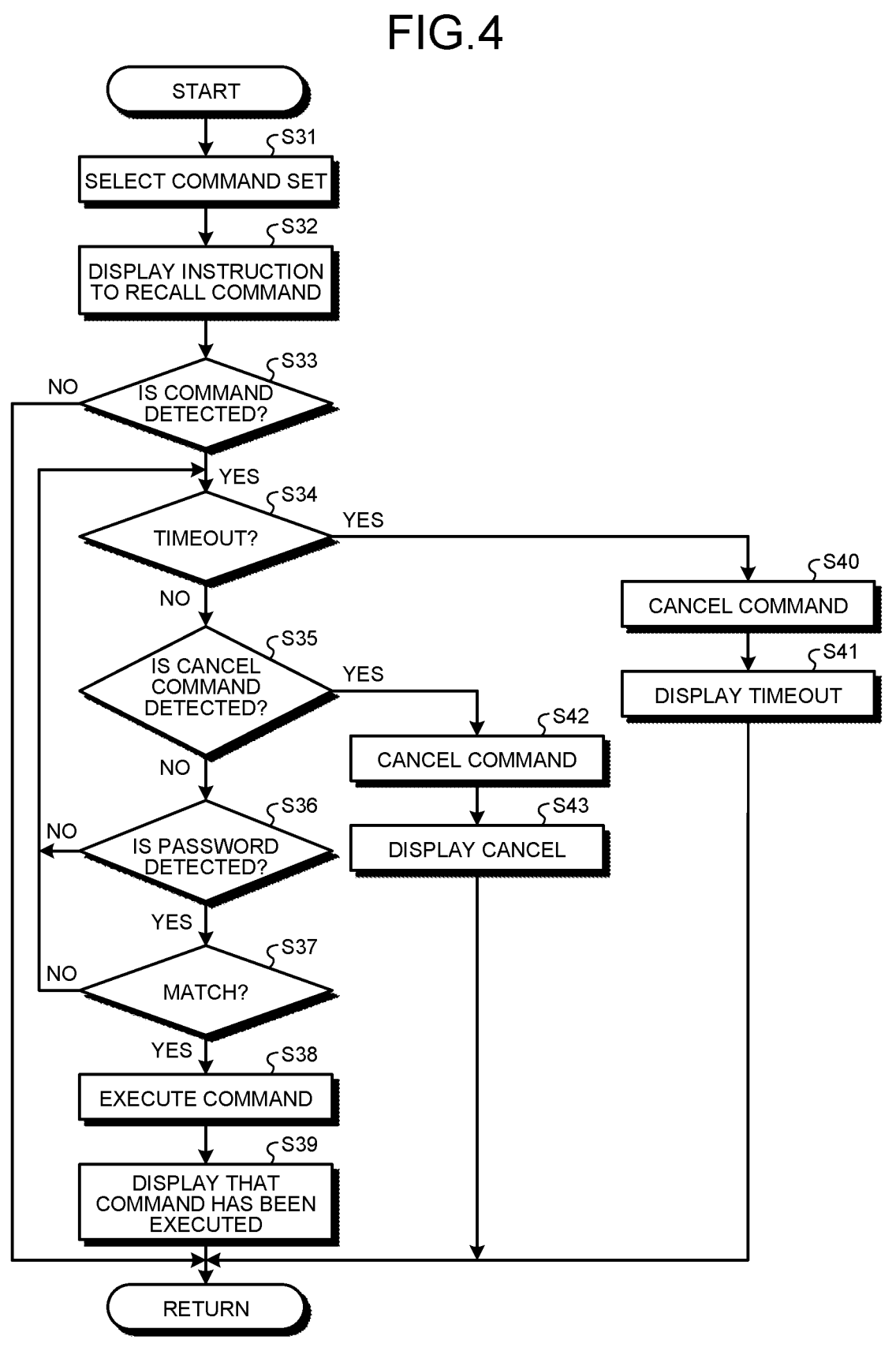

```
          ┌─────────────┐
          │    START    │
          └──────┬──────┘
                 │ ⌇S31
          ┌──────▼──────────┐
          │SELECT COMMAND SET│
          └──────┬──────────┘
                 │ ⌇S32
          ┌──────▼──────────┐
          │DISPLAY INSTRUCTION│
          │TO RECALL COMMAND │
          └──────┬──────────┘
                 │ ⌇S33
    NO      ◇─────▼─────◇
  ◄─────────  IS COMMAND
            │ DETECTED? │
              ◇────┬────◇
                 YES │     ⌇S34
            ◇────────▼────────◇        YES
            │    TIMEOUT?      │───────────────────┐
              ◇────────┬───────◇                   │  ⌇S40
                   NO  │                     ┌──────▼──────────┐
                       │  ⌇S35               │ CANCEL COMMAND  │
            ◇──────────▼───────◇  YES        └──────┬──────────┘
            │   IS CANCEL       │────┐              │ ⌇S41
            │   COMMAND         │    │       ┌──────▼──────────┐
            │   DETECTED?       │    │       │ DISPLAY TIMEOUT │
              ◇─────────┬──────◇    │       └──────┬──────────┘
                    NO  │           │              │
                        │  ⌇S36     │  ⌇S42        │
    NO      ◇───────────▼──◇  ┌─────▼──────────┐   │
  ◄─────────  IS PASSWORD     │ CANCEL COMMAND │   │
            │  DETECTED?  │   └─────┬──────────┘   │
              ◇──────┬────◇         │ ⌇S43         │
                 YES │        ┌─────▼──────────┐   │
                     │  ⌇S37  │ DISPLAY CANCEL │   │
    NO      ◇────────▼──◇     └─────┬──────────┘   │
  ◄─────────   MATCH?                │             │
              ◇──────┬──◇            │             │
                 YES │  ⌇S38         │             │
          ┌──────────▼────┐          │             │
          │EXECUTE COMMAND│          │             │
          └──────┬────────┘          │             │
                 │  ⌇S39             │             │
          ┌──────▼────────┐          │             │
          │ DISPLAY THAT  │          │             │
          │COMMAND HAS BEEN│         │             │
          │  EXECUTED     │          │             │
          └──────┬────────┘          │             │
                 ▼                    │             │
          ┌──────▼──────┐◄────────────┴─────────────┘
          │   RETURN    │
          └─────────────┘
```

FIG.7

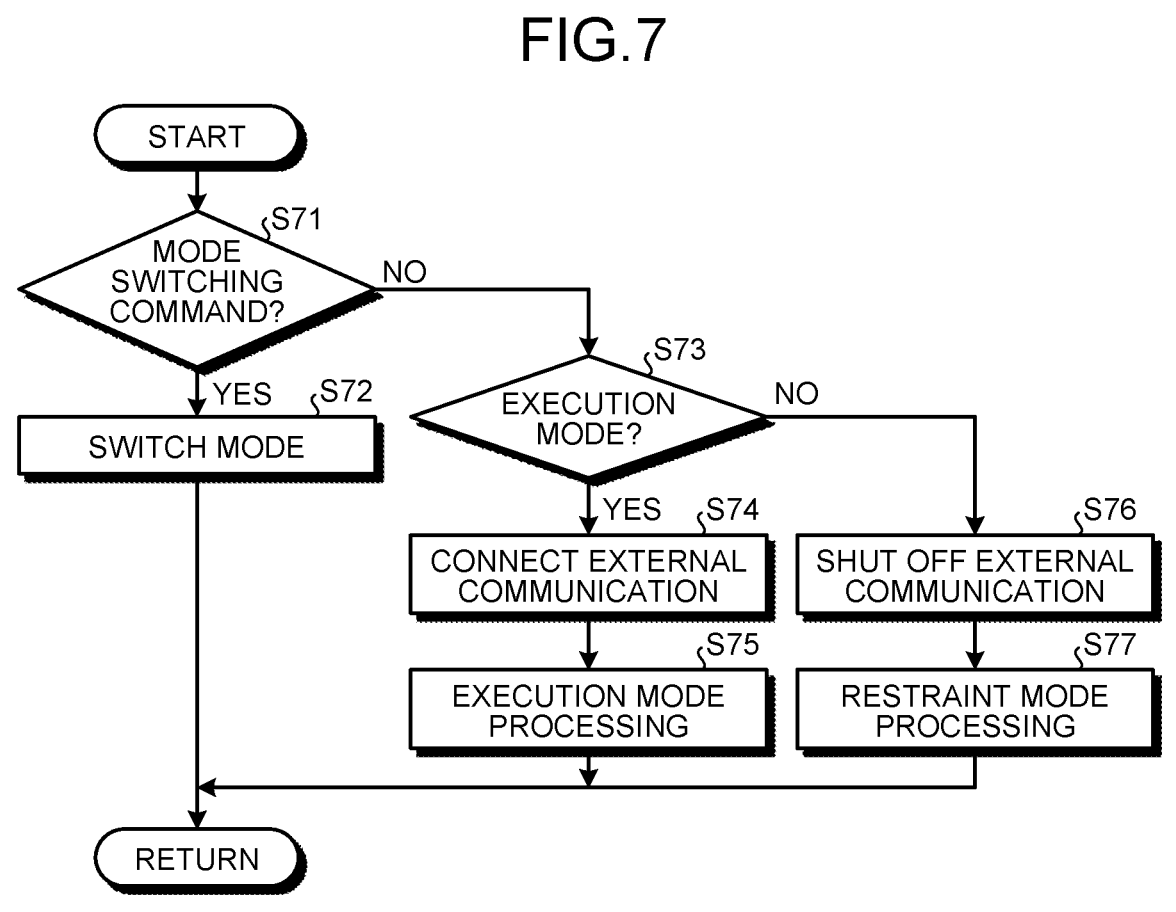

START

S71

MODE SWITCHING COMMAND?

NO

YES    S72

SWITCH MODE

S73

EXECUTION MODE?

NO

YES    S74

CONNECT EXTERNAL COMMUNICATION

S76

SHUT OFF EXTERNAL COMMUNICATION

S75

EXECUTION MODE PROCESSING

S77

RESTRAINT MODE PROCESSING

RETURN

OPERATION CONTROL DEVICE, OPERATION CONTROL METHOD, AND COMPUTER-READABLE STORAGE MEDIUM

CROSS-REFERENCE TO RELATED APPLICATION

This application is a Continuation of PCT International Application No. PCT/JP2022/025001 filed on Jun. 23, 2022 which claims the benefit of priority from Japanese Patent Applications No. 2021-149595 and No. 2021-149687, both filed on Sep. 14, 2021, the entire contents of all of which are incorporated herein by reference.

BACKGROUND

The present disclosure relates to an operation control device, an operation control method, and a computer-readable storage medium.

In recent years, technology for measuring brain information has advanced, and brain-machine interfaces (BMIs), which directly connect the brain to machines, are becoming a reality. As such a technology, for example, there is one described in Patent Literature 1. Patent Literature 1 is about a technique to obtain multiple steady-state visual evoked potential signals from a user when the user is stimulated, to supply a system command signal (JP-A-2013-117957).

In the conventional BMI systems, when executing a brainwave command, if an irrelevant stimulus is present, the irrelevant stimulus could be reflected in brain waves and executed. For example, in the case of a forward movement command in which a robot moves forward when commanding the robot to "move forward" in mind, if someone around it just says "move forward," the brain may involuntarily recall the command "move forward", leading to unintentional issuance of the forward movement command. Moreover, when operating the robot while viewing its movement, if the robot moving forward is displayed on a monitor, because the brain of the operator that sees it may autonomously continue to recall "move forward", the forward movement command is to be issued unintentionally.

SUMMARY

An operation control device according to one aspect of the present disclosure include: a brain-information acquiring unit configured to acquire brain information of a user; a determining unit configured to determine whether the brain information acquired by the brain-information acquiring unit includes brain information corresponding to a first command based on a language system, brain information corresponding to a second command based on a system other than the language system, and brain information corresponding to a third command that is a password; and an executing unit configured to execute processing corresponding to the first command when the determining unit determines that the brain information corresponding to the first command, the brain information corresponding to the second command, and the brain information corresponding to the third command are acquired.

An operation control method according to another aspect of the present disclosure includes: acquiring brain information of a user; determining whether the acquired brain information includes brain information corresponding to a first command based on a language system, brain information corresponding to a second command based on a system other than the language command, and brain information corresponding to a third command that is a password; and executing processing corresponding to the first command when it is determined that the brain information corresponding to the first command, the brain information corresponding to the second command, and the brain information corresponding to the third command are acquired.

A non-transitory computer-readable storage medium according to still another aspect of the present disclosure stores a computer program causing a computer to execute: acquiring brain information of a user; determining whether the acquired brain information includes brain information corresponding to a first command based on a language system, brain information corresponding to a second command based on a system other than the language command, and brain information corresponding to a third command that is a password; and executing processing corresponding to the first command when it is determined that the brain information corresponding to the first command, the brain information corresponding to the second command, and the brain information corresponding to the third command are acquired.

BRIEF DESCRIPTION OF THE DRAWINGS

FIG. 4 is a flow chart illustrating a flow of processing in the operation control device according to the second embodiment;

FIG. 7 is a flow chart illustrating a flow of mode switching processing in the operation control device according to the third embodiment.

DETAILED DESCRIPTION

Hereinafter, embodiments of an operation control device, an operation control method, and a computer program according to the present disclosure will be explained in detail with reference to the accompanying drawings. The embodiments below are not intended to limit the present invention.

First Embodiment

Operation Control Device

Figure 1:
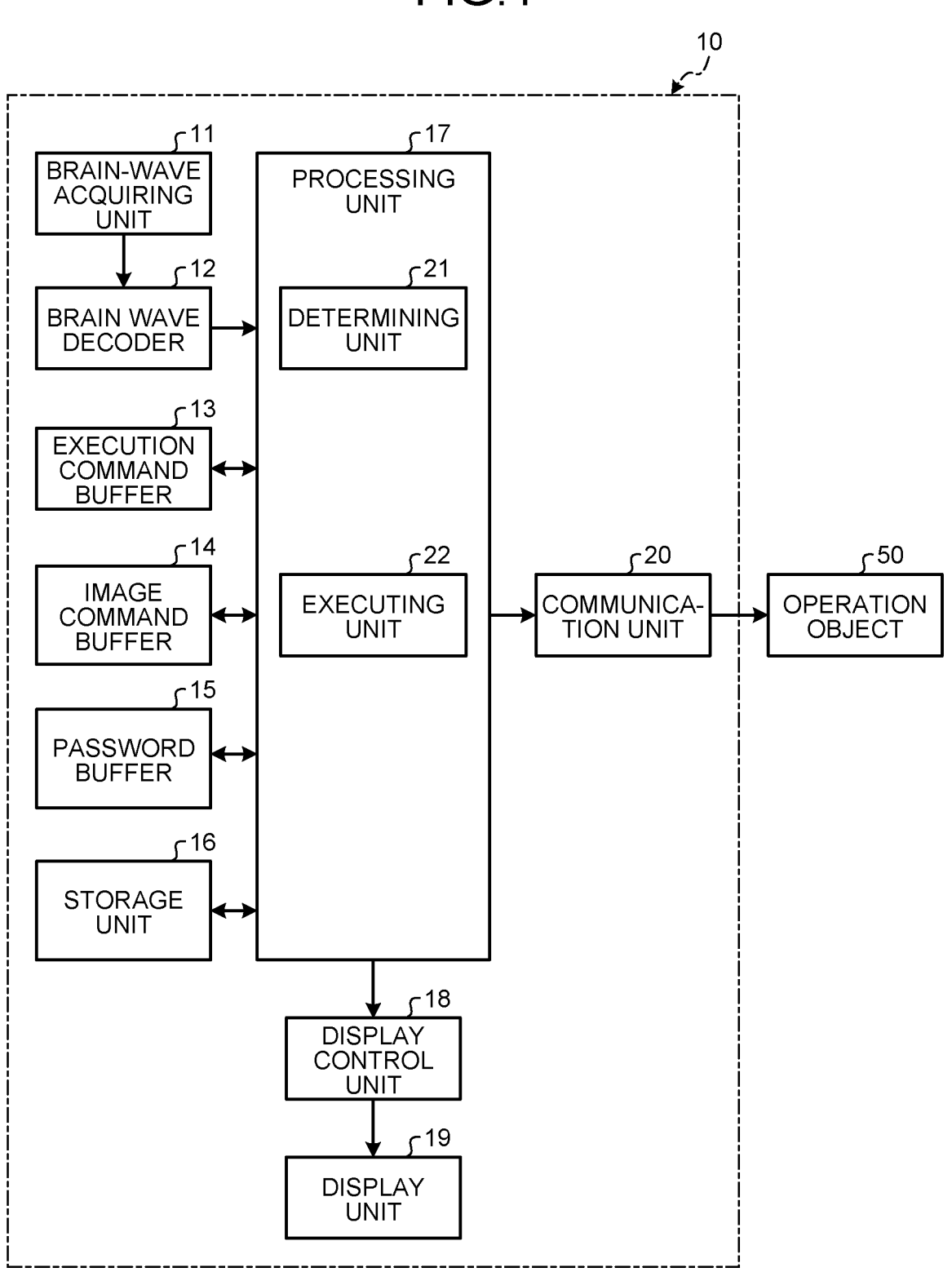
FIG. 1 is a block diagram illustrating a configuration example of an operation control device according to a first embodiment.

FIG. 1 is a block diagram illustrating a configuration example of an operation control device according to a first embodiment.

In the first embodiment, as illustrated in FIG. 1, an operation control device 10 is to control an operation object 50 based on brain information of a user. The operation control device 10 includes a brain-wave acquiring unit (brain-information acquiring unit) 11, a brain wave decoder 12, an execution command buffer 13, an image command buffer 14, a password buffer 15, a storage unit 16, a processing unit 17, a display control unit 18, a display unit 19, and a communication unit 20.

The operation object 50 is, for example, a robot, but is not limited to robots, and may be a device activated by communication, and the like. Although not illustrated, the operation object 50 is equipped with a driving device, a control device that controls the driving device, and a communication unit capable of receiving a control signal and the like. In the operation object 50, the control device activates a robot by driving the driving device when the communication unit receives a control signal.

The brain-wave acquiring unit 11 is wearable on the head of a user. The brain wave decoder 12, the processing unit 17, the display control unit 18, the display unit 19, and the communication unit 20 may be worn by the user, or may be placed at a predetermined position without being worn. Moreover, the brain-wave acquiring unit 11, the brain wave decoder 12, the processing unit 17, the display control unit 18, the display unit 19, and the communication unit 20 may be arranged in an integrated unit, or may be arranged separately.

The brain-wave acquiring unit 11 is to acquire brain waves, which are brain information of the user. The brain-wave acquiring unit 11 includes an electric sensor (for example, electrode) that detects, for example, brain waves obtained from weak electric currents flowing in a neural network of the brain. The brain-wave acquiring unit 11 detects a potential of a weak electric current (electrical signal) based on thoughts of the user including contemplation and the like or when the user receives a stimulus from an external environment. The brain-information acquiring unit is not limited to the brain-wave acquiring unit 11. The brain-information acquiring unit may be, for example, one that acquires blood flow due to brain activity, which is brain information of a user, by near-infrared light measurement or the like. The brain-wave acquiring unit 11 is connected to the brain wave decoder 12, and transmits brain waves, which are brain information, acquired from the user to the brain wave decoder 12.

The brain wave decoder 12 restores an electrical signal of the brain waves of the user acquired by the brain-wave acquiring unit 11 to thought information of the user. In this case, electrical signals of brain waves of the user and thought information of the user are associated with each other in advance. In this case, for example, electrical signals of brain waves and thought information of a user are associated by using machine learning, such as deep learning.

The execution command buffer 13 temporarily stores a first command determined by a determining unit 21 based on the thought information of the user. The first command is a command when brain information is based on a language system (textual information). Moreover, the first command is brain information of the left hemisphere and is a command to activate the operation object 50, and is a command, such as "move forward", "move backward", "stop", "speed up", "speed down", "turn right", and "turn left". In this case, the first commands and actions of the operation object 50 are associated with each other in advance. The execution command buffer 13 can transmit and receive various kinds of data between itself and the processing unit 17.

The first command is not limited to a concept indicating an instructed action, and may be one supplemented with a numerical value or the like complementing a concept indicating an instructed action. For example, the brain wave decoder 12 may detect the strength of a brainwave as a decimal value ranging from 0 to 1 while restoring thought information of the user based on an electrical signal acquired by the brain-wave acquiring unit 11, to set the first command adding the strength (numerical value) to the thought information of the user. In this case, the numerical value of the first command is a calculation of the maximum value of torque output of the driving device equipped in the operation object 50.

The image command buffer 14 temporarily stores a second command determined by the determining unit 21 based on thought information of the user. The second command is a command when brain information is based on an image system. Moreover, the second command is brain information of the right hemisphere, and is a command representing an intention to execute an operation of the operation object 50, and is a command to decide execution of the first command. The second command corresponding to the first command is set in advance by the user, and is stored in the storage unit 16. The second command may be set by the processing unit 17, and stored in the storage unit 16, and may be notified to the user in advance. The image command buffer 14 can transmit and receive various kinds of data between itself and the processing unit 17.

The second command is an image of visual, auditory, tactile, and olfactory, signifying a condition imaged in the brain, and is a combination of one or more abstract concepts and the like. For example, the second command is an image of color based on vision, an image of sound based on hearing, an image of temperature based on touch, an image of smell based on olfaction, and the like. Furthermore, to the second command, a single command (image) may be set, or respective commands (images) according to kinds of the first command may be set, regardless of the content of the first command.

For example, when the first command is a command based on "start" of an action, the second command corresponding to the first command is set to "blue" based on visual. On the other hand, when the first command is a command based on "stop" of action, the second command corresponding to the first command is set to "red" based on visual. Moreover, when the first command is a command based on work, the second command corresponding to the first command is set to "green" based on visual. On the other hand, when the first command is a command based on private, the second command corresponding to the first command is set to "yellow" based on visual. The second command corresponding to the first command may be set to a related image, or may be set to an image not related at all.

For example, in the human system, auditory information acquired through the ears is transmitted from the auditory system to the comprehension system, the emotional system, the cognitive system, the communication system, and the like, and is then stored in the memory system as language in the left hemisphere of the brain. On the other hand, in the human system, for example, auditory information acquired through the ears is stored in the memory system as an image in the right brain. Therefore, in the case in which the user recalls a language-type command as the first command and the case in which the user recalls an image-type command as the second command, activation locations in the brain are different. Accordingly, by confirming a language-type intention and an image-type intention of the user, it is possible to confirm an operation for the operation object 50 and confirm the intention to execute the operation.

The password buffer 15 temporarily stores a password, which is a third command, determined by the determining unit 21 based on the thought information of the user. The password, which is the third command, is a command to further determine execution of the first command. A password corresponding to a command is set in advance by the user, and is stored in the storage unit 16. The password may be set by the processing unit 17 and stored in the storage unit 16, and may be notified to the user in advance. The password is a combination of one or more of a character string, an image of an object, an abstract concept, and the like. The password may be set as a single common password for different types of the first command, or individual passwords may be set separately for different types of the first command. By setting an individual password for each of the first commands, "move forward", "move backward", "stop", "speed up", "speed down", "turn right", and "turn left", it is possible to avoid a situation of issuing the next first command inadvertently due to excessive momentum. The password buffer 15 can transmit and receive various kinds of data between itself and the processing unit 17.

The storage unit 16 stores the multiple first commands, the multiple second commands, and the multiple third commands being passwords. Moreover, the storage unit 16 may store training data obtained by training with the correlation between brainwave electrical signals and thought information of the user using machine learning. The second commands and the third commands are associated with the first commands in advance.

The execution command buffer 13, the image command buffer 14, and the password buffer 15 are recording units, such as a semiconductor memory device including a random access memory (RAM) equipped in the processing unit 17, a flash memory, and the like. The storage unit 16 is constituted of a memory card, a solid state drive (SSD), an external storage device, and the like.

The processing unit 17 is an arithmetic processing device (control device) that is constituted of, for example, a central processing unit (CPU) or the like. The processing unit 17 loads a stored program to a memory, and executes a command included in the program. The processing unit 17 includes an internal memory not illustrated, and the internal memory is used for temporary storage of data in the processing unit 17. The processing unit 17 includes the determining unit 21 and an executing unit 22 as its functions. Moreover, the processing unit 17 transmits processing results to the display control unit 18 and the communication unit 20.

The determining unit 21 determines whether the thought information of the user acquired by the brain-wave acquiring unit 11 and restored by the brain wave decoder 12 is a brain wave corresponding to three different commands of the first command, the second command, and the third command (password).

Specifically, the determining unit 21 compares the thought information of the user restored by the brain wave decoder 12 and the first command stored in the storage unit 16. At this time, the determining unit 21 determines that the thought information of the user is the first command when the thought information matches the first command. The determining unit 21 stores the command determined as the first command in the execution command buffer 13. On the other hand, the determining unit 21 determines that the thought information of the user is not the first command when the thought information of the user does not match the first command. In this case, the determining unit 21 does not store the command determined that it is not the first command in the execution command buffer 13. In the determination of a match between the thought information of the user restored by the brain wave decoder 12 and the first command by the determining unit 21, it is determined as a match when it is possible to determine that the thought information of the user signifies the first command, even if it is not a complete match.

Furthermore, the determining unit 21 compares the thought information of the user restored by the brain wave decoder 12 and the second command stored in the storage unit 16. At this time, the determining unit 21 determines that the thought information of the user is the second command when the thought information of the user matches the second command. The determining unit 21 stores the second command in the image command buffer 14 when the thought information of the user is determined as the second command. On the other hand, the determining unit 21 determines that the thought information of the user is not the second command when the thought information of the user does not match the second command stored in the storage unit 16. The determining unit 21 does not store the second command in the image command buffer 14 when it is determined that the thought information of the user is not the second command.

Moreover, the determining unit 21 compares the thought information of the user restored by the brain wave decoder 12 and the password (the third command) stored in the storage unit 16. At this time, the determining unit 21 determines that the thought information of the user is the password when the thought information of the user matches the password. The determining unit 21 stores the password in the password buffer 15 when it is determined that the thought information of the user is the password. On the other hand, the determining unit 21 determines that the thought information of the user is not the password when the thought information of the user does not match the password stored in the storage unit 16. The determining unit 21 does not store the password in the password buffer 15 when it is determined that the thought information of the user is not the password.

Furthermore, the determining unit 21 determines whether there is a correlation among the first command stored in the execution command buffer 13, the second command stored in the image command buffer 14, and the password stored in the password buffer 15.

The executing unit 22 executes processing corresponding to the first command when it is determined that the determining unit 21 has acquired the brain wave corresponding to the first command, the brain wave corresponding to the second command, and the brain wave corresponding to the password. Specifically, the executing unit 22 executes the processing corresponding to the first command when it is determined that thought information of the user acquired first is the first command by the determining unit 21, it is determined that thought information of the user acquired next is the second command by the determining unit 21, and it is determined that thought information of the user acquired thereafter is the password by the determining unit 21. Order of the brain waves acquired by the determining unit 21, namely, first command, the second command, and the password (third command), is not limited to the order described above, and may be any order.

However, the executing unit 22 cancels the acquired first command when predetermined waiting time, for example, three seconds, has passed since the determining unit 21 determines acquisition of the first command and the second command. Moreover, the executing unit 22 cancels the acquired first command when the processing unit 17 acquires a cancel command as thought of the user after the determining unit 21 determines acquisition of the first command and the second command. The cancel command is preset, and an electrical signal of a brain wave of the user and thought information of the user (cancel command) are associated in advance, and stored in the storage unit 16. The cancel command is, for example, a symbol or a concept different from the first command, such as "×" and "cancel".

To the display control unit 18, the display unit 19 is connected. the display control unit 18 transmits a processing result transmitted from the processing unit 17 to the display unit 19, to display it. The display control unit 18 displays an operation state of the operation control device 10, which is the processing result of the processing unit 17, or a thought instruction to the user on the display unit 19.

The display unit 19 displays the operation state of the operation control device 10 and a thought instruction to the user transmitted from the display control unit 18. The display unit 19 presents necessary information to the user. The display unit 19 is, for example, a display including a liquid crystal display (LCD), an organic electrolumines-cence (EL) display, or the like.

The communication unit 20 is capable of wireless communication with the operation object 50. The communication unit 20 transmits processing information processed by the processing unit 17 to the operation object 50. Specifically, when the determining unit 21 determines that a brain wave corresponding to the first command and a brain wave corresponding to the password are acquired, the executing unit 22 generates a control signal corresponding to processing of the first command to send to the communication unit 20. The communication unit 20 transmits the control signal corresponding to the processing of the first command to the operation object 50. Receiving the first command transmitted by the communication unit 20, the operation object 50 is actuated according to the processing of the first command.

Operation Control Method

Figure 2:
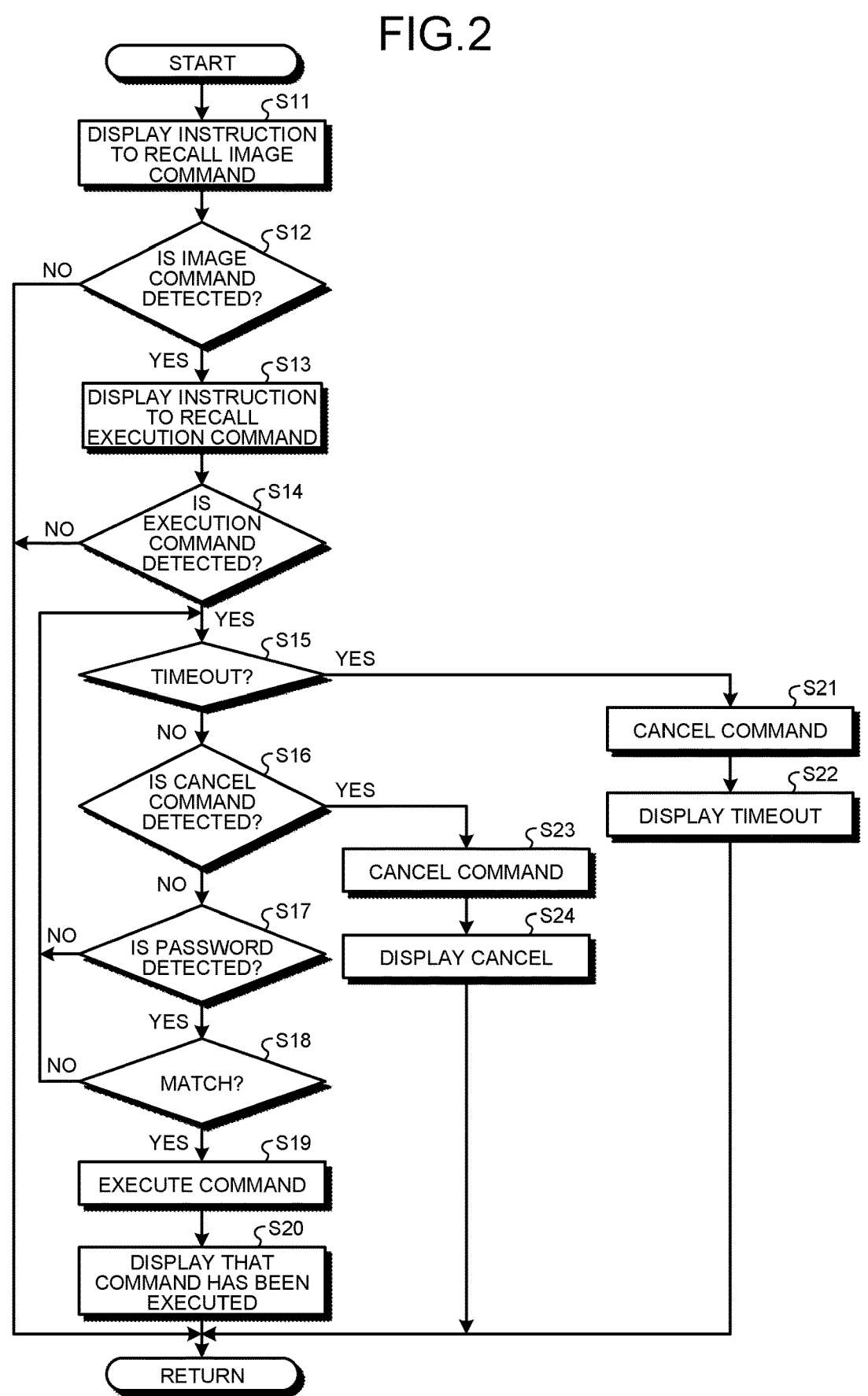
FIG. 2 is a flowchart illustrating a flow of processing in the operation control device according to the first embodiment.

A operation control method performed by the operation control device 10 will be explained. FIG. 2 is a flowchart illustrating a flow of processing of the operation control device according to the present embodiment.

AS illustrated in FIG. 1 and FIG. 2, at step S11, the processing unit 17 controls the display control unit 18, to cause the display unit 19 to display an instruction to recall the second command (image command) to the user. The display control unit 18 displays a message instructing to recall the second command representing an operation, such as "please recall an image command", on the display unit 19.

At step S12, the determining unit 21 determines whether the thought information of the user acquired by the brain-wave acquiring unit 11 and restored by the brain wave decoder 12 is a brain wave corresponding to the second command (image command). The determining unit 21 compares the thought information of the user restored by the brain wave decoder 12 and the second command stored in the storage unit 16, and exits this routine if it is determined that the thought information of the user does not match the second command (NO), determining that the thought information of the user is not the first command. On the other hand, the determining unit 21 determines the thought information of the user as the second command when it is determined that the thought information of the user matches the second command stored in the storage unit 16 (YES), and the determining unit 21 stores the second command in the image command buffer 14, and shifts to step S14.

At step S13, the processing unit 17 displays an instruction to recall the first command (execution command) on the display unit 19 to the user by controlling the display control unit 18. The display control unit 18 displays a message instructing to recall the first command representing an operation, such as "please recall an execution command", on the display unit 19.

At step S14, the determining unit 21 determines whether the thought information of the user acquired by the brain-wave acquiring unit 11 and restored by the brain wave decoder 12 is a brain wave corresponding to the first command (execution command). The determining unit 21 compares the thought information of the user restored by the brain wave decoder 12 and the first command stored in the storage unit 16, and exits, when it is determined that the thought information of the user does not match the first command (NO), this routine, determining that the thought information of the user is not the first command. On the other hand, the determining unit 21 determines the thought information of the user is the first command when it is determined that the thought information of the user matches the first command stored in the storage unit 16 (YES), and stores the first command in the execution command buffer 13, and shifts to step S15.

At step S15, the processing unit 17 determines whether a timeout has occurred as predetermined waiting time has passed since the determining unit 21 determines acquisition of the first command. When it is determined that a timeout has occurred (YES), the processing unit 17 cancels the acquired first command and second command at step S20. At step S21, the processing unit 17 displays that the first command and the second command are canceled on the display unit 19 to the user by controlling the display control unit 18. The display control unit 18 displays a message of timeout indicating, for example, "it has timed out" on the display unit 19.

When it is determined that a timeout has not occurred (NO), the processing unit 17 determines whether a brain wave corresponding to the cancel command is detected at step S16. When it is determined that a brain wave corresponding to the cancel command is detected (YES), the processing unit 17 cancels the acquired first command and second command at step S23. At step S24, the processing unit 17 displays that the first command and the second command are canceled on the display unit 19 to the user by controlling the display control unit 18. The display control unit 18 displays a message indicating that the first command is canceled, such as "the first command is canceled", on the display unit 19.

On the other hand, when it is determined that a brain wave corresponding to the cancel command is not detected (NO), the processing unit 17 determines whether a brain wave corresponding to the third command (password) is detected at step S17. The determining unit 21 compares the thought information of the user restored by the brain wave decoder 12 and the third command (password) stored in the storage unit 16, and returns, when it is determined that the thought information of the user does not match the third command (password) (NO), to step S15 and continues the processing.

On the other hand, when it is determined that the thought information of the user matches the third command (password) stored in the storage unit 16 (YES), the determining unit 21 determines the thought information of the user as the third command (password), and stores the determined password in the password buffer 15. Furthermore, at step S18, the determining unit 21 determines whether the second command determined at step S12 and stored in the image command buffer 14, the first command determined at step S14 and stored in the execution command buffer 13, and the password determined at step S17 and stored in the password buffer 15 are the first command, the second command, and the password, the relevance of which is associated in advance. When the determining unit 21 determines that the first command, the second command, and the password are not associated (NO), it returns to step S15. When the determining unit 21 determines that the first command, the second command, and the password are associated (YES), it shifts to step S19.

At step S19, the executing unit 22 executes processing corresponding to the first command. That is, the executing unit 22 transmits a control signal corresponding to the processing of the first command to the operation object 50 by the communication unit 20, to actuate the operation object 50. At step S18, the processing unit 17 displays that the first command has been executed on the display unit 19 to the user by controlling the display control unit 18. The display control unit 18 displays a message indicating that the first command has been executed, such as "the speed-up command is executed".

Second Embodiment

Operation Control Device

Figure 3:
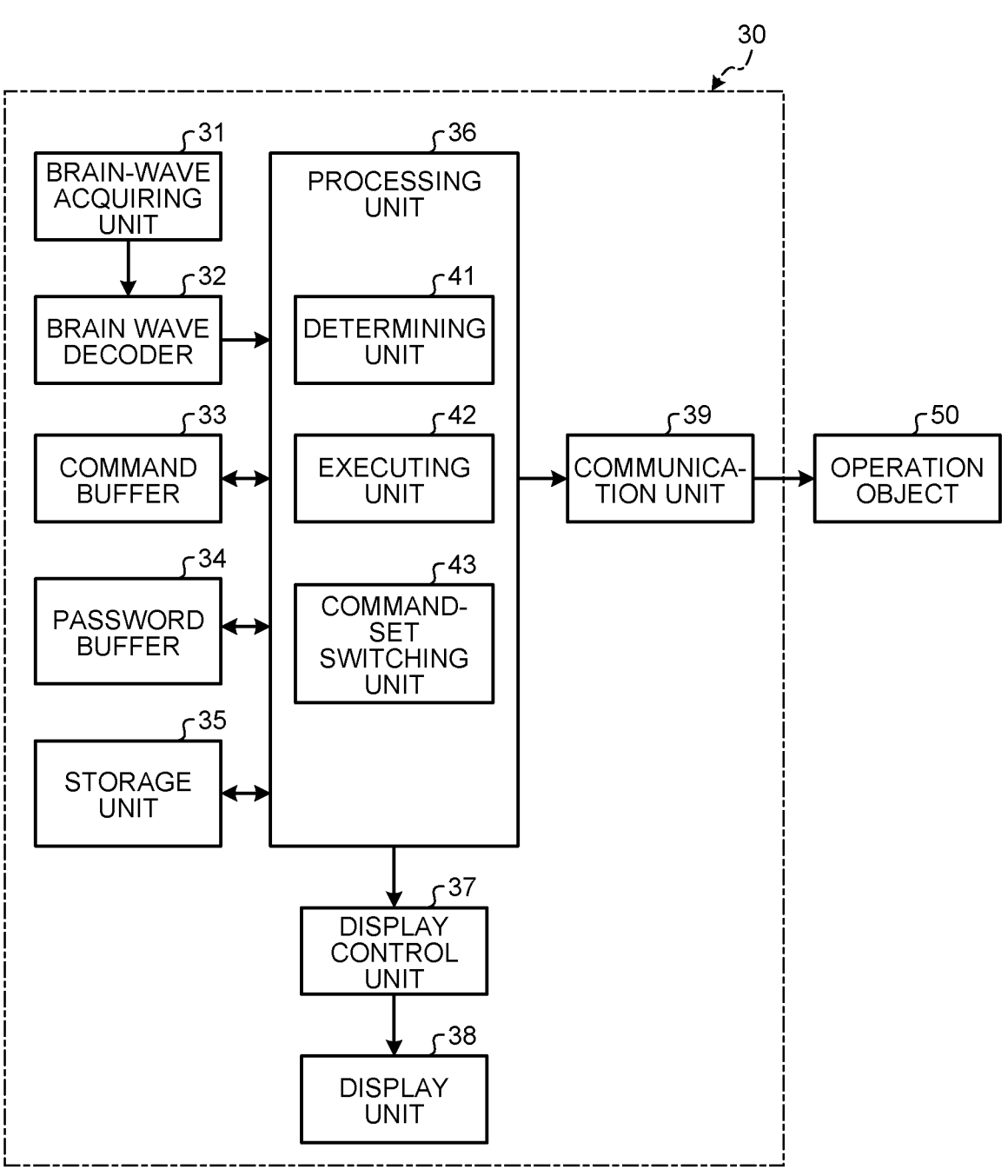
FIG. 3 is a block diagram illustrating a configuration example of an operation control device according to a second embodiment.

FIG. 3 is a block diagram illustrating a configuration example of an operation control device according to a second embodiment. The second embodiment is a modification of processing of the first command in the first embodiment described above and, therefore, explanation of the processing of the second command is omitted.

In the second embodiment, as illustrate in FIG. 3, an operation control device 30 is to control operation of the operation object 50 based on brain information of a user. The operation control device 30 includes a brain-wave acquiring unit (brain-information acquiring unit) 31, a brain wave decoder 32, a command buffer 33, a password buffer 34, a storage unit 35, a processing unit 36, a display control unit 37, a display unit 38, and a communication unit 39.

The operation object 50 is, for example, a robot, but is not limited to robots, and may be any device activated by communication, and the like. Although not illustrated, the operation object 50 is equipped with a driving device, a control device that controls the driving device, and a communication unit capable of receiving a control signal and the like. In the operation object 50, the control device activates a robot by driving the driving device when the communication unit receives a control signal.

The brain-wave acquiring unit 31 is wearable on the head of a user. The brain wave decoder 32, the processing unit 36, the display control unit 37, the display unit 38, and the communication unit 39 may be worn by the user, or may be placed at a predetermined position without being worn. Moreover, the brain-wave acquiring unit 31, the brain wave decoder 32, the processing unit 36, the display control unit 37, the display unit 38, and the communication unit 39 may be arranged in an integrated unit, or may be arranged separately.

The brain-wave acquiring unit 31 is to acquire brain waves, which are brain information of the user. The brain-wave acquiring unit 31 includes an electric sensor (for example, electrode) that detects, for example, brain waves obtained from weak electric currents flowing in a neural network of the brain. The brain-wave acquiring unit 31 detects a potential of a weak electric current (electrical signal) based on thoughts of the user including contemplation and the like when the user receives a stimulus from an external environment. The brain-information acquiring unit is not limited to the brain-wave acquiring unit 31. The brain-information acquiring unit may be, for example, one that acquires blood flow due to brain activity, which is brain information of a user, by near-infrared light measurement or the like. The brain-wave acquiring unit 31 is connected to the brain wave decoder 32, and transmits brain waves, which are brain information, acquired from the user to the brain wave decoder 32.

The brain wave decoder 32 restores an electrical signal of the brain waves of the user acquired by the brain-wave acquiring unit 31 to thought information of the user. In this case, electrical signals of brain waves of the user and thought information of the user are associated with each other in advance. In this case, for example, electrical signals of brain waves and thought information of a user are associated by using machine learning, such as deep learning.

The command buffer 33 temporarily stores a first command determined by a determining unit 41 based on the thought information of the user. The first command is an image command in which operations to operate the operation object 50 are set based on an image system. A command corresponding to an operation to operate the operation object 50 is brain information in the left hemisphere of the brain, and is a command when brain information is based on a language system (textual information). The command corresponding to an operation to operate the operation object 50 is a command to activate the operation object 50, and is, for example, a command such as "move forward", "move backward", "stop", "speed up", "speed down", "turn right", and "turn left".

On the other hand, the image command is brain information in the right hemisphere of the brain, and is a command when brain information is based on an image system. The image command is, for example, "dog", "cat", "sea", "chime sound", "bell sound", or the like. The image commands are set so as to be linked to commands corresponding to operations. That is, the image commands, such as "dog", "cat", "sea", "chime sound", and "bell sound" as the first command, are set corresponding to "move forward", "move backward", "stop", "speed up", "speed down", "turn right", and "turn left" as operations of the operation object 50.

In this case, a first image command corresponding to a first action of the operation object 50 and a second image command corresponding to a second action paired with the first action are set as a command set, making a set. When the first action is "start", the second action is "stop" that is paired with the first action. Moreover, when the first action is "turn right", the second action is "turn left" that is paired with the first action. Furthermore, when the first action is "move forward", the second action is "move backward" that is paired with the first action.

Moreover, the first image command and the second image command are set as a multiple command set having different brain semantic spaces. The brain semantic spaces visualize a distance relationship among multiple semantic categories expressed in the brain. For example, the first action is set as "start" and the second action is set as "stop", and the first image command corresponding to the first action is "dog", and the second image command corresponding to the second action is "cat". Because the first image command "dog" and the second command "cat" belong to similar semantic categories such as animals, the brain semantic spaces are close to each other. On the other hand, the first image command corresponding to the first action "start" is set to "dog" and the second image command corresponding to the second action "stop" to "sea". Because the first image command "dog" and the second image command "sea" belong to different semantic categories such as animals and nature, the brain semantic spaces are far from each other.

That is, the pair of the first action "start"—the first image command "dog" and the second action "stop"—"the second image command "cat" is set as a short-distance command set. On the other hand, the pair of the first action "start"—"the first image command "dog" and the second action "stop"—the second image command "sea" is set as a long-distance command set. Moreover, a pair of the first action "turn right"—"the first image command "tiger" and the second action "turn left"—the second image command "lion" is set as a short-distance command set. On the other hand, a pair of the first action "turn right"—the first image command "tiger" and the second action "turn left"—the second image command "sky" is set as a long-distance command set.

For example, a user that is good at distinguishing the first image command and the second image command corresponding to operations of the operation object 50 uses the short-distance command set. On the other hand, a user that is not good at distinguishing the first image command and the second image command corresponding to operations of the operation object 50 uses the long-distance command. Not limited to two kinds, the short-distance command set and the long-distance command set, the command sets may have three kinds, for example, by adding a middle-distance command set, or may have four kinds or more.

A command set of the first image command and the second image command corresponding to operations of the operation object 50 is set and stored in the storage unit 35 in advance. The command buffer 33 can transmit and receive various kinds of data between itself and the processing unit 36.

The password buffer 34 temporarily stores a password that is the third command determined by the determining unit 41 based on thought information of the user. The third command, which is a password, is a command to determine execution of the first command. A password corresponding to a command is set by the user, and stored in the storage unit 35 in advance. A password may be set by the processing unit 36 and stored in the storage unit 35, and may be notified to the user in advance. A password is a combination of one or more of a character string, an image of an object, an abstract concept, and the like. The password may be set as a single common password for different types of the first command, or individual passwords may be set separately for different types of the first command. By setting an individual password for each of the first commands, "move forward", "move backward", "stop", "speed up", "speed down", "turn right", and "turn left", it is possible to avoid a situation of issuing the next first command inadvertently due to excessive momentum. The password buffer 34 can transmit and receive various kinds of data between itself and the processing unit 36.

The storage unit 35 stores the first commands and the third commands, which are passwords. The first commands are image commands representing the first action and the second action corresponding to operations of the operation object 50, and are stored as command sets. Moreover, the storage unit 35 may store training data that has been trained with correlations between electrical signals and thought information by machine learning. The third command is associated with the first command in advance.

The command buffer 33 and the password buffer 34 are, for example, a recording unit, such as a random access memory (RAM) equipped in the processing unit 36 and a semiconductor memory device including a flash memory and the like. The storage unit 35 is constituted of a memory card, an SSD, an external storage device, and the like.

The processing unit 36 is, for example, an arithmetic processing device (control device) that is constituted of a CPU or the like. The processing unit 36 loads a stored program to a memory, and executes a command included in the program. The processing unit 36 includes an internal memory not illustrated, and the internal memory is used for temporary storage of data in the processing unit 36. The processing unit 36 includes a determining unit 41, an executing unit 42, and a command-set switching unit 43 as its functions. Furthermore, the processing unit 36 transmits processing results to the display control unit 37 and the communication unit 39.

The determining unit 41 determines whether the thought information acquired by the brain-wave acquiring unit 31 and restored by the brain wave decoder 32 is a brain wave corresponding to the two different first command and the third command (password). In this case, the determining unit 41 determines whether the thought information of the user acquired by the brain-wave acquiring unit 31 and restored by the brain wave decoder 32 is brain information corresponding to an image, which is the first command.

Specifically, the determining unit 41 compares the thought information of the user restored by the brain wave decoder 32 and the first command stored in the storage unit 35. When the thought information of the user matches the first command, the determining unit 41 determines that the thought information of the user is the first command. At this time, the determining unit 41 stores the command determined as the first command in the command buffer 33. On the other hand, when the thought information of the user does not match the first command, the determining unit 41 determines that the thought information of the user is not the first command. At this time, the determining unit 41 does not store the command determined as not the first command in the command buffer 33. In the determination of a match between the thought information of the user restored by the brain wave decoder 32 and the first command by the determining unit 41, it is determined as a match when it is possible to determine that the thought information of the user signifies the first command, even if it is not a complete match.

Moreover, the determining unit 41 compares the thought information of the user restored by the brain wave decoder 32 and the password stored in the storage unit 35. When the thought information of the user matches the password, the determining unit 41 determines that the thought information of the user is the pass word. The determining unit 41 stores the password in the password buffer 34 when it is determined that the thought information of the user is the password. On the other hand, the determining unit 41 determines that the thought information of the user is not the password when the thought information of the user does not match the password stored in the storage unit 35. The determining unit 41 does not store the password in the password buffer 34 when it is determined that the thought information of the user is not the password.

Furthermore, the determining unit 41 determines whether there is a correlation between the command stored in the command buffer 33 and the password stored in the password buffer 34.

The executing unit 42 executes processing of the operation linked to the first command when the determining unit 41 determines that a brain wave corresponding to the first command and a brain wave corresponding to the password are acquired. Specifically, the executing unit 42 executes the operation of the operation object 50 linked to the image command as the first command when it is determined that thought information of the user acquired first is the first command by the determining unit 41, and it is determined that thought information of the user acquired next is the password by the determining unit 41.

However, the executing unit 42 cancels the acquired first command when predetermined waiting time, for example, three seconds, has passed since the determining unit 21 determines acquisition of the first command. Moreover, the executing unit 42 cancels the acquired first command when the processing unit 36 acquires a cancel command as thought of the user after the determining unit 21 determines acquisition of the first command. The cancel command is preset, and an electrical signal of a brain wave of the user and thought information of the user (cancel command) are associated and stored in the storage unit 16 in advance. The cancel command is, for example, a symbol or a concept different from the first command, such as "×" and "cancel".

The command-set switching unit 43 selects an appropriate command set based on the brain information acquired by the brain-wave acquiring unit 31 from among multiple command sets stored in the storage unit 35, to switch command sets. Specifically, the storage unit 35 stores multiple command sets, such as the short-distance command sets of brain semantic spaces close to each other and the long-distance command sets of brain semantic spaces far from each other. The command-set switching unit 43 selects a command set suitable for the user from among the command sets stored in the storage unit 35. Although it is configured such that the command-set switching unit 43 selects an appropriate command set based on brain information from among multiple command sets, it is not limited to this configuration. For example, the command-set switching unit 43 may be configured to present multiple command sets stored in the storage unit 35 to the user, and to switch to a command set selected by the user.

To the display control unit 37, the display unit 38 is connected. The display control unit 37 transmits a processing result transmitted from the processing unit 36 to the display unit 38 to have it displayed. The display control unit 37 causes the display unit 38 to display an operation state of the operation control device 30, which is the processing result of the processing unit 36, and a thought instruction to the user.

The display unit 38 displays an operation state of the operation control device 30 transmitted from the display control unit 37 and a thought instruction to the user. The display unit 38 presents necessary information to the user. The display unit 38 is, for example, a display including an LCD, an organic EL display, or the like.

The communication unit 39 can perform wireless communications with the operation object 50. The communication unit 39 transmits processing information processed by the processing unit 36 to the operation object 50. Specifically, when the determining unit 41 determines that a brain wave corresponding to the first command and a brain wave corresponding to the password are acquired, the executing unit 42 generates a control signal corresponding to the processing of the first command to send it to the communication unit 39. The communication unit 39 transmits the control signal corresponding to the processing of the first command to the operation object 50. Receiving the first command transmitted by the communication unit 39, the operation object 50 operates according to the processing of the first command.

Operation Control Method

An operation control method performed by the operation control device 30 will be explained. FIG. 4 is a flowchart illustrating a flow of processing of the operation control device according to the second embodiment, and FIG. 5 is a flowchart illustrating a flow of command-set selection processing.

As illustrated in FIG. 3 and FIG. 4, at step S31, the command-set switching unit 43 of the processing unit 36 selects an optimal command set based on brain information of the user from among multiple command sets stored in the storage unit 35. In this case, the command-set switching unit 43 may select an optimal command set for the brain information of the user, or may select a command set based on a selection instruction from the user.

Figure 5:
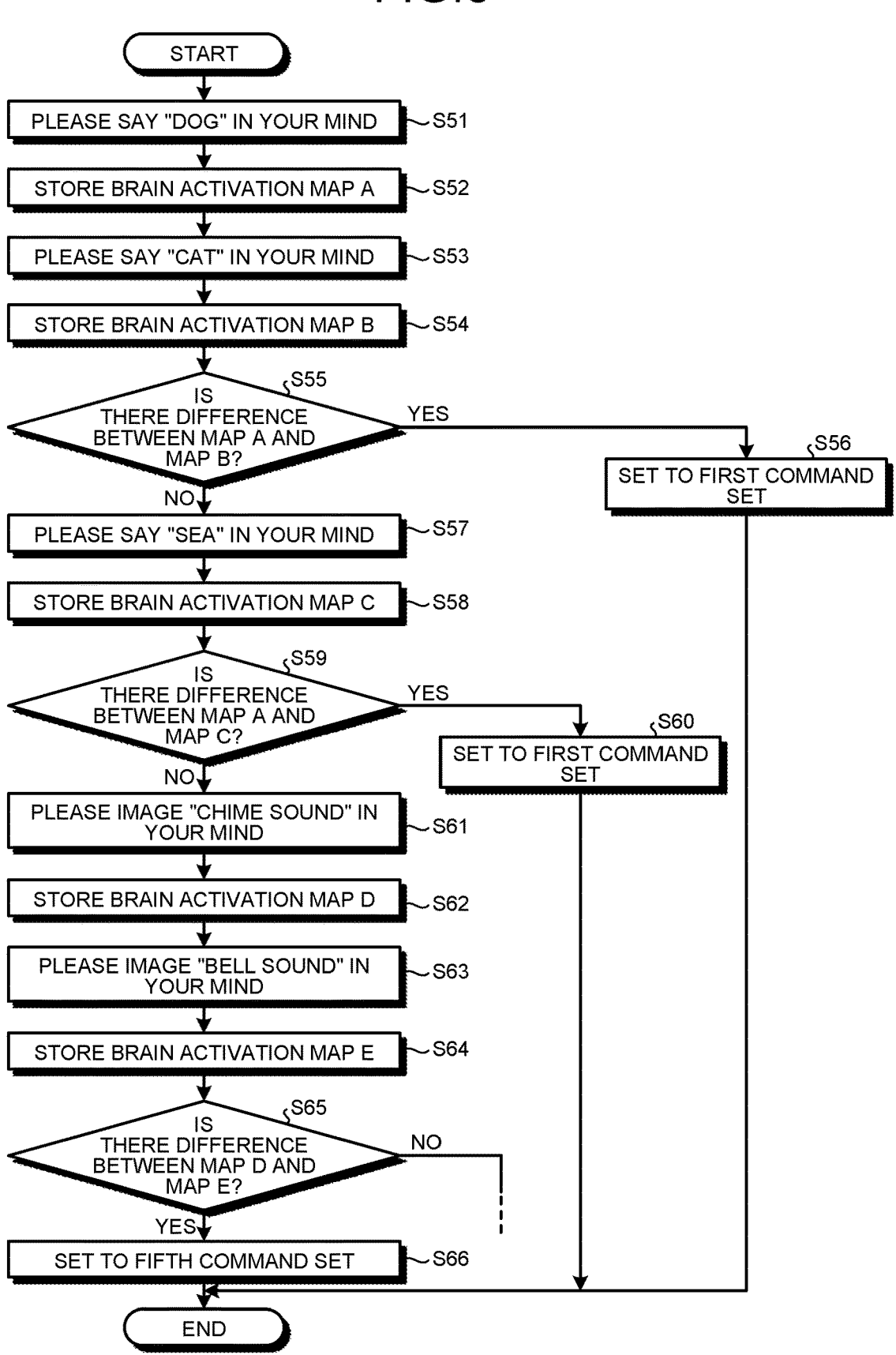
FIG. 5 is a flowchart illustrating a flow of command-set selection processing.

For example, as illustrated in FIG. 5, at step S51, the command-set switching unit 43 causes the display control unit 37 to display "please say dog in your mind" on the display unit 38. At step S52, the command-set switching unit 43 stores a brain activation map A that is thought information of the user acquired by the brain-wave acquiring unit 31 and restored by the brain wave decoder 32 in the storage unit 35. At step S53, the command-set switching unit 43 causes the display control unit 37 to display "please say cat in your mind" on the display unit 38. At step S54, the command-set switching unit 43 stores a brain activation map B that is thought information acquired by the brain-wave acquiring unit 31 and restored by the brain decoder 12 in the storage unit 35.

At step S55, the command-set switching unit 43 determines whether there is a difference set in advance between the brain activation map A and the brain activation map B. When it is determined that there is a difference between the brain activation map A and the brain activation map B (YES), the command-set switching unit 43 sets it to a first command set (for example, the short-distance command set) at step S56 and ends the processing. On the other hand, when it is determined that there is no difference between the brain activation map A and the brain activation map B (NO), the command-set switching unit 43 causes the display control unit 37 to display "please say sea in your mind" on the display unit 38 at step S57. At step S58, the command-set switching unit 43 stores a brain activation map C that is thought information of the user acquired by the brain-wave acquiring unit 31 and restored by the brain wave decoder 32 in the storage unit 35.

At step S59, the command-set switching unit 43 determines whether there is a difference set in advance between the brain activation map A and the brain activation map C. When it is determined that there is a difference between the brain activation map A and the brain activation map C (YES), the command-set switching unit 43 sets it as a second command set (for example, the middle-distance command set) at step S60, and ends the processing. On the other hand, when it is determined that there is no difference between the brain activation map A and the brain activation map C (NO), the command-set switching unit 43 causes the display control unit 37 to display "please image a chime sound in your mind" on the display unit 38 at step S61. At step S62, the command-set switching unit 43 stores a brain activation map D that is thought information acquired by the brain-wave acquiring unit 31 and restored by the brain wave decoder 32 in the storage unit 35. At step S63, the command-set switching unit 43 causes the display control unit 37 to display "please image a bell sound in your mind" on the display unit 38. At step S64, the command-set switching unit 43 stores a brain activation map E that is thought information of the user acquired by the brain-wave acquiring unit 31 and restored by the brain wave decoder 32 in the storage unit 35.

At step S65, the command-set switching unit 43 determines whether there is a difference set in advance between the brain activation map D and the brain activation map E. When it is determined that there is a difference between the brain activation map D and the brain activation map E (YES), the command-set switching unit 43 sets it to a third command set (for example, the long-distance command set) at step S66, and ends the processing. On the other hand, when it is determined that there is no difference between the brain activation map D and the brain activation map E (NO), the command-set switching unit 43 performs processing similar to the processing at steps S61 to S65, and sets a command set with which brain semantic spaces are to be positioned far from each other.

Returning back to FIG. 3 and FIG. 4, when a command set appropriate for the user is selected, at step S32, the processing unit 36 controls the display control unit 37, to display an instruction to recall the first command on the display unit 38 for the user. The display control unit 37 displays a message instructing to recall the first command representing an operation, such as "please recall the first command" on the display unit 38.

At step S33, the determining unit 41 determines whether thought information acquired by the brain-wave acquiring unit 11 and restored by the brain wave decoder 32 is a brain wave corresponding to the first command. The determining unit 41 compares the thought information of the user restored by the brain wave decoder 32 and the first command stored in the storage unit 35, and exits this routine when it is determined that the thought information of the user does not match the first command (NO), determining that the thought information of the user is not the first command. On the other hand, the determining unit 41 stores the first command in the command buffer 33 when it is determined that the thought information of the user matches the first command stored in the storage unit 35 (YES), determining that the thought information of the user is the first command, and shifts to step S34.

At step S34, the processing unit 36 determines whether a timeout has occurred as predetermined waiting time has passed since the determining unit 41 determines acquisition of the first command. When it is determined that a timeout has occurred (YES), the processing unit 36 cancels the acquired first command at step S40. At step S41, the processing unit 36 displays that the first command is canceled on the display unit 38 to the user by controlling the display control unit 37. The display control unit 37 displays a message of timeout indicating, for example, "it has timed out" on the display unit 38.

When it is determined that a timeout has not occurred (NO), the processing unit 36 determines whether a brain wave corresponding to the cancel command is detected at step S35. When it is determined that a brain wave corresponding to the cancel command is detected (YES), the processing unit 36 cancels the acquired first command at step S42. At step S43, the processing unit 36 displays that the first command is canceled on the display unit 38 to the user by controlling the display control unit 37. The display control unit 37 displays a message indicating that the first command is canceled, such as "the first command is canceled", on the display unit 38.

On the other hand, when it is determined that a brain wave corresponding to the cancel command is not detected (NO), the processing unit 36 determines whether a brain wave corresponding to the third command (password) is detected at step S35. The determining unit 41 compares the thought information of the user restored by the brain wave decoder 32 and the password stored in the storage unit 35, and returns, when it is determined that the thought information of the user does not match the password (NO), to step S33 and continues the processing.

On the other hand, when it is determined that the thought information of the user matches the password stored in the storage unit 35 (YES), the determining unit 41 determines the thought information of the user as the password, and stores the determined password in the password buffer 34. Furthermore, at step S37, the determining unit 41 determines whether the first command determined at step S33 and stored in the command buffer 33 and the password determined at step S36 and stored in the password buffer 34 are the first command and the password that are correlated in advance. When the determining unit 41 determines that the first command and the password are not associated (NO), it returns to step S34. When the determining unit 41 determines that the first command and the password are associated (YES), it shifts to step S38.

At step S38, the executing unit 42 executes processing corresponding to the first command. That is, the executing unit 42 transmits a control signal corresponding to the processing of the first command to the operation object 50 by the communication unit 39, to actuate the operation object 50. At step S39, the processing unit 36 displays that the first command has been executed on the display unit 38 to the user by controlling the display control unit 37. The display control unit 37 displays a message indicating that the first command has been executed, such as "the speed-up command is executed".

Third Embodiment

Figure 6:
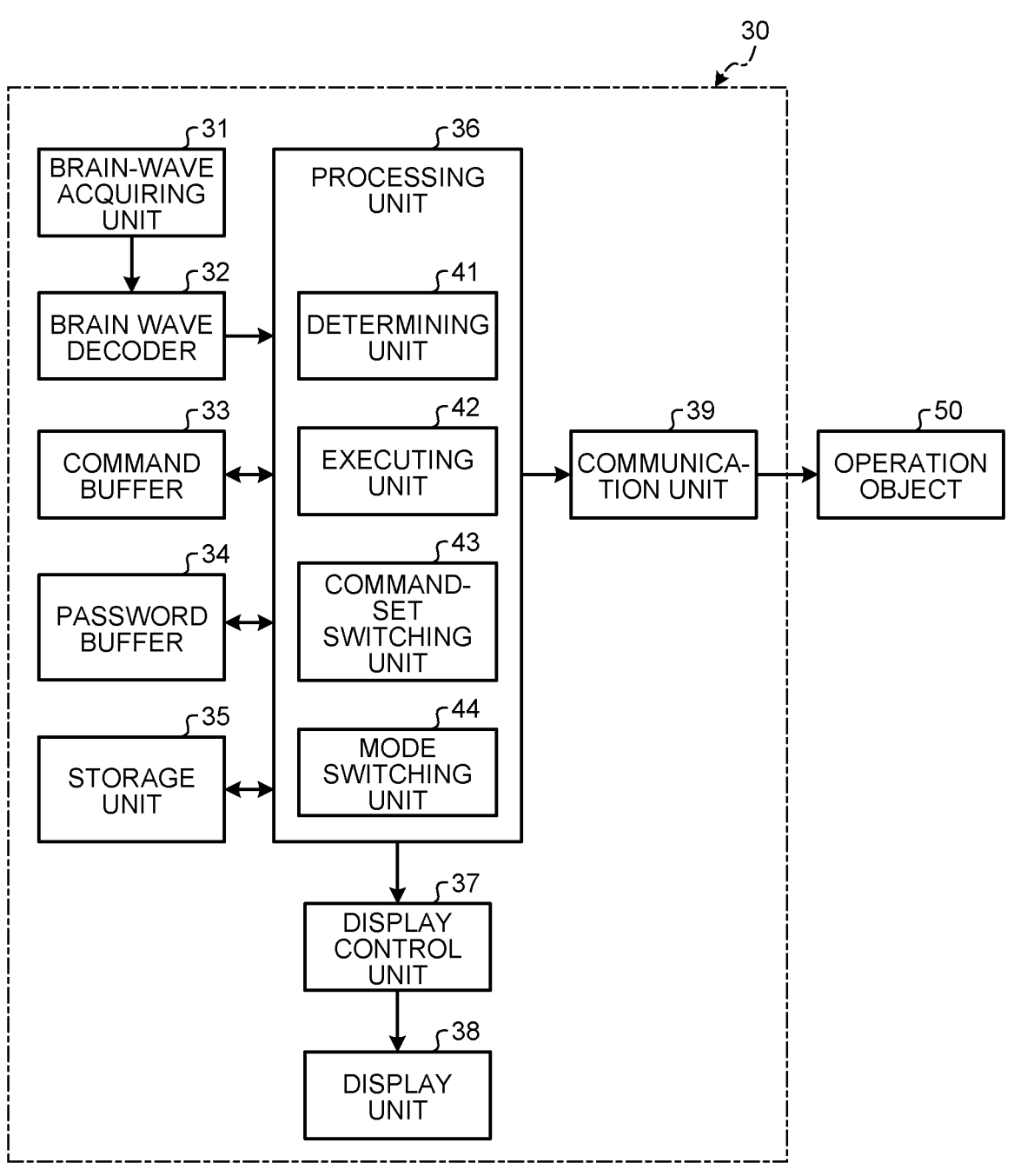
FIG. 6 is a block diagram illustrating a configuration example of an operation control device according to a third embodiment.

FIG. 6 is a block diagram illustrating a configuration example of an operation control device according to a third embodiment. To components having functions similar to those of the second embodiment, common reference symbols are assigned, and detailed explanation is omitted.

In the third embodiment, as illustrated in FIG. 6, the operation control device 30 is to control operation of the operation object 50 based on brain information of a user. The operation control device 30 includes the brain-wave acquiring unit (brain-information acquiring unit) 31, the brain wave decoder 32, the command buffer 33, the password buffer 34, the storage unit 35, the processing unit 36, the display control unit 37, the display unit 38, and the communication unit 39. The brain-wave acquiring unit 31, the brain wave decoder 32, the command buffer 33, the password buffer 34, the storage unit 35, the display control unit 37, the display unit 38, and the communication unit 39 are similar to those of the second embodiment.

The processing unit 36 includes the determining unit 41, the executing unit 42, the command-set switching unit 43, and a mode switching unit 44 as its functions. The determining unit 41, the executing unit 42, and the command-set switching unit 43 are similar to those of the second embodiment.

The mode switching unit 44 switches between an execution mode and a restraint mode (non-execution mode). The execution mode is a mode in which the executing unit 42 executes processing of an operation corresponding to the first command (image command). On the other hand, the restraint mode is a mode in which the executing unit 42 does not execute the processing of the operation corresponding to the first command (image command). The mode switching unit 44 switches between the execution mode and the restraint mode based on thought information of the user acquired by the brain-wave acquiring unit 31 and restored by the brain wave decoder 32.

Specifically, the execution mode is a mode in which external communication is enabled, and in the third embodiment, transmission of a signal from the processing unit 36 to the communication unit 39 is enabled. In the execution mode, for example, a wide area network (WAN), such as the Internet, is connected. Therefore, it becomes possible for the user to operate the operation object 50 in the execution mode. On the other hand, in the restraint mode, transmission of a signal from the processing unit 36 to the communication unit 39 is disconnected. In the restraint mode, for example, the WAN, such as the Internet, is disconnected. Therefore, it becomes impossible for the user to operate the operation object 50. That is, in the restraint mode, for example, only a human-body-surface current interface is effective, and it is possible for the user to switch between the execution mode and the restraint mode by the mode switching unit 44.

FIG. 7 is a flowchart illustrating a flow of the mode switching processing of the operation control device according to the third embodiment.

As illustrated in FIG. 6 and FIG. 7, at step S71, the processing unit 36 determines whether thought information acquired by the brain-wave acquiring unit 31 and restored by the brain wave decoder 32 is a mode switching command. The mode switching command is a command such as "switch the mode". When it is determined that the thought information of the user is the mode switching command (YES), the processing unit 36 switches the mode at step S72. That is, the mode switching unit 44 switches to the restraint mode if the current mode is the execution mode, and switches to the execution mode if it is the restraint mode. At this time, the mode switching unit 44 displays that the mode has been switched on the display unit 38 to the user by controlling the display control unit 37. The display control unit 37 displays processing details, such as "the mode is switched to the execution mode", for example, when it is switched to the execution mode on the display unit 38, and displays processing details, such as "the mode is switched to the restraint mode", for example, when it is switched to the restraint mode on the display unit 38, to notify the user that the mode has been switched.

On the other hand, at step S71, when it is determined that the thought information of the user is not the mode switching command (NO), the processing unit 36 determines whether the execution mode is selected at present. When the processing unit 36 determines that the execution mode is selected at present (YES), the processing unit 36 connects to the communication unit 39 at step S74, to be in an external communication enabled state. At step S75, processing of the execution mode is started.

On the other hand, when the processing unit 36 determines that the execution mode is not selected at present (NO) at step S73, the processing unit 36 cancels connection with the communication unit 39 at step S76, to be in an external communication disabled state. At step S77, processing of the restraint mode is started.

Because the processing of the execution mode is similar to that of the second embodiment, explanation thereof is omitted. Moreover, the processing of the restraint mode is basically the mode switching processing in FIG. 7.

Effects

In the present embodiment, the brain-wave acquiring unit (brain-information acquiring unit) 11 that acquires brain information of a user, the determining unit 21 that determines whether brain information acquired by the brain-wave acquiring unit 11 is brain information corresponding to the first command based on the language system and brain information corresponding to the second command based on a system other than the language system, and the executing unit 22 that executes processing corresponding to the first command when the determining unit 21 determines that brain information corresponding to the first command and brain information corresponding to the second command are acquired are included.

Therefore, when brain information corresponding to the first command and brain information corresponding to the second command are acquired, by executing the processing corresponding to the first command, the operation object 50 is activated. That is, even if the brain information corresponding to the first command representing the operation is acquired, the processing corresponding to the first command is not executed unless the brain information corresponding to the second command representing the intension of execution of the operation is acquired. Therefore, a content of the first command and the execution timing are triggered more safely and accurately without being affected by an irrelevant stimulus, and an appropriate brain wave command can be implemented.

Moreover, in the present embodiment, the second command is a command when brain information is based on the image system. Therefore, by detecting both the first command based on the language system and the second command based on the image system, the intention of execution of operation of the operation object 50 can be accurately confirmed by the user.

Furthermore, in the present embodiment, the first command is brain information in the left hemisphere of the brain, and is a command representing operation details to operate the operation object 50, and the second command is brain information in the right hemisphere of the brain, and is a command representing an intention to execute the operation of the operation object 50. Therefore, by acquiring brain information corresponding to the second command, the user can confirm the intention to execute the operation of the operation object 50, and an appropriate brain wave command can be implemented.

Moreover, in the present embodiment, the storage unit 35 that stores the first command as an image command based on the image system is included, and the determining unit 41 determines whether brain information acquired by the brain-wave acquiring unit 31 is brain information corresponding to an image stored in the storage unit 35, and the executing unit 42 executes processing of operation corresponding to the image command when the determining unit 41 determines that the brain information corresponding to the image command is acquired.

Therefore, by executing the processing of the operation corresponding to the image command when brain information corresponding to the image command is acquired, the operation object 50 is activated. That is, when a command representing an operation is replaced with an image command and brain information corresponding to the image command is acquired, processing of the operation corresponding to the image command is performed. Therefore, the operation corresponding to the image command is triggered more safely and accurately without being affected by an irrelevant stimulus, and an appropriate brain wave command can be implemented.

Furthermore, in the present embodiment, the storage unit 35 stores the first image command corresponding to the first action of the operation object 50 and the second image command corresponding to the second action paired with the first action as multiple command sets, and the command-set switching unit 43 that switches to a command set based on brain information acquired by the brain-wave acquiring unit 31 from among the multiple command sets is included. Therefore, a command set suitable for a user can be selected according to the aptitude of the user, and an appropriate brain wave command can be implemented.

Moreover, in the present embodiment, the mode switching unit 44 that switches between the execution mode in which the executing unit 42 executes processing of an operation corresponding to the first command (image command) and the restraint mode (non-execution mode) in which the executing unit 42 does not execute the processing of the operation corresponding to the first command (image command) based on brain information acquired by the brain-wave acquiring unit 31 is included. Therefore, for example, because external communication is shut off in the restraint mode, brain information of the user does not leak outside, and only in the execution mode when it is intended to operate the operation object 50, external communication is connected and an appropriate brain wave command can be implemented.

The operation control device 10 according to the present invention has so far been explained, but other than the embodiments described above, it may be implemented in various different embodiments.

The illustrated respective components of the operation control device 10 are of functional concept, and it is not necessarily required to be configured physically as illustrated. That is, specific forms of the respective devices are not limited to the ones illustrated, and all or some thereof can be configured to be distributed or integrated functionally or physically in arbitrary units according to various kinds of processing loads, usage conditions, and the like of the respective devices.

The configuration of the operation control device 10 is implemented, for example, by a program loaded on a memory or the like as software. In the embodiment described above, it is explained as functional blocks implemented by coordination of the hardware or software. That is, these functional blocks can be implemented by various forms only by hardware, only by software, or by a combination of those.

The components described above include those easily conceivable by a person skilled in the art, and those practically the same. Furthermore, the components described above can be combined as appropriate. Moreover, various omissions, replacements, and alterations of configuration are possible within a range not departing from a gist of the present invention.

The operation control device, the operation control method, and the computer program of the present disclosure are applicable to, for example, a brain machine interface.

The computer program for implementing the operation control method according to the present disclosure may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, an appropriate brain wave command can be executed without being affected by an irrelevant stimulus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation control device comprising:
at least one memory configured to store computer executable instructions; and
at least one processor configured to execute the computer executable instructions to perform operations, comprising:
acquiring brain information of a user;
determining whether the brain information includes brain information corresponding to a first command based on a language system, brain information corresponding to a second command based on a system other than the language system, and brain information corresponding to a third command that is a password;
executing processing corresponding to the first command when it is determined that the brain information corresponding to the first command, the brain information corresponding to the second command, and the brain information corresponding to the third command are acquired;
storing, in a storage unit, the first command as an image command based on an image system; and
switching to a command set according to a difference between first brain information acquired by the acquiring in response to a first instruction and second brain information acquired by the acquiring in response to a second instruction, from among a plurality of command sets,
wherein the first command is brain information in a left hemisphere of a brain, and is a command representing an operation to operate an operation object, and the second command is brain information in a right hemisphere of the brain, and is a command representing an intention to execute the operation of the operation object,
wherein the determining comprises determining whether the brain information acquired by the acquiring includes brain information corresponding to an image stored in the storage unit,
wherein the executing comprises executing processing of an operation corresponding to the image command when it is determined that the brain information corresponding to the image command is acquired, and
wherein the storing comprises storing, in the storage unit, the plurality of command sets, each being of a first image command corresponding to a first action of the operation object and a second image command corresponding to a second action paired with the first action.

2. The operation control device according to claim 1, wherein the second command is a command when the brain information is based on the image system.

3. The operation control device according to claim 1, wherein the operations further comprise switching, based on the brain information acquired by the acquiring, between an execution mode in which the executing executes processing of an operation corresponding to the image command, and a non-execution mode in which processing of an operation corresponding to the image command is not executed.

4. An operation control method comprising:

acquiring brain information of a user;

determining whether the acquired brain information includes brain information corresponding to a first command based on a language system, brain information corresponding to a second command based on a system other than the language system, and brain information corresponding to a third command that is a password;

executing processing corresponding to the first command when it is determined that the brain information corresponding to the first command, the brain information corresponding to the second command, and the brain information corresponding to the third command are acquired;

storing, in a storage unit, the first command as an image command based on the image system; and switching to a command set according to a difference between first brain information acquired by the acquiring in response to a first instruction and second brain information acquired by the acquiring in response to a second instruction, from among a plurality of command sets, wherein the first command is brain information in a left hemisphere of a brain, and is a command representing an operation to operate an operation object, and the second command is brain information in a right hemisphere of the brain, and is a command representing an intention to execute the operation of the operation object, wherein the determining comprises determining whether the brain information acquired by the acquiring includes brain information corresponding to an image stored in the storage unit, wherein the executing comprises executing processing of an operation corresponding to the image command based on determining that the brain information corresponding to the image command is acquired, and wherein the storing comprises storing, in the storage unit, the plurality of command sets, each being of a first image command corresponding to a first action of the operation object and a second image command corresponding to a second action paired with the first action.

5. A non-transitory computer-readable storage medium storing a computer program causing a computer to execute:

acquiring brain information of a user;

determining whether the acquired brain information includes brain information corresponding to a first command based on a language system, brain information corresponding to a second command based on a system other than the language system, and brain information corresponding to a third command that is a password; and executing processing corresponding to the first command when it is determined that the brain information corresponding to the first command, the brain information corresponding to the second command, and the brain information corresponding to the third command are acquired;

storing, in a storage unit, the first command as an image command based on the image system; and switching to a command set according to a difference between first brain information acquired by the acquiring in response to a first instruction and second brain information acquired by the acquiring in response to a second instruction, from among a plurality of command sets, wherein the first command is brain information in a left hemisphere of a brain, and is a command representing an operation to operate an operation object, and the second command is brain information in a right hemisphere of the brain, and is a command representing an intention to execute the operation of the operation object, wherein the determining comprises determining whether the brain information acquired by the acquiring includes brain information corresponding to an image stored in the storage unit, wherein the executing comprises executing processing of an operation corresponding to the image command based on determining that the brain information corresponding to the image command is acquired, and wherein the storing comprises storing, in the storage unit, the plurality of command sets, each being of a first image command corresponding to a first action of the operation object and a second image command corresponding to a second action paired with the first action.

* * * * *